(12) United States Patent
Ohkubo et al.

(10) Patent No.: US 8,416,330 B2
(45) Date of Patent: *Apr. 9, 2013

(54) SOLID STATE IMAGING DEVICE FOR IMAGING AN OBJECT PLACED THEREON

(75) Inventors: Hiroaki Ohkubo, Tokyo (JP); Yasutaka Nakashiba, Tokyo (JP)

(73) Assignee: Renesas Electronics Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,256

(22) Filed: Jul. 16, 2012

(65) Prior Publication Data

US 2012/0281125 A1    Nov. 8, 2012

Related U.S. Application Data

(60) Division of application No. 11/268,812, filed on Nov. 7, 2005, now Pat. No. 8,233,063, which is a continuation of application No. 08/907,036, filed on Jul. 17, 2001, now Pat. No. 7,030,919.

(30) Foreign Application Priority Data

Jul. 17, 2000   (JP) ................................ 2000-215597

(51) Int. Cl.
*H04N 3/14* (2006.01)
*H01L 31/062* (2006.01)
*H01L 27/00* (2006.01)
(52) U.S. Cl. ...................... 348/294; 257/291; 250/208.1
(58) Field of Classification Search .................. 348/294, 348/308; 257/291, 292; 250/208.1; 324/658, 324/678; 59/294, 308

See application file for complete search history.

(56) References Cited

U.S. PATENT DOCUMENTS

| | | | |
|---|---|---|---|
| 5,144,498 A | 9/1992 | Vincent | 359/885 |
| 5,291,052 A | 3/1994 | Kim et al. | 257/369 |
| 5,598,016 A | 1/1997 | Tanabe et al. | 257/229 |
| 5,606,578 A | 2/1997 | O'Dea | 375/298 |
| 5,991,467 A | 11/1999 | Kamiko | 382/312 |
| 6,016,355 A | 1/2000 | Dickinson et al. | 382/124 |
| 6,128,399 A * | 10/2000 | Calmel | 348/294 |
| 6,168,965 B1 * | 1/2001 | Malinovich et al. | 257/258 |
| 6,512,381 B2 | 1/2003 | Kramer | 324/658 |
| 6,713,797 B1 | 3/2004 | Desrochers et al. | 257/295 |
| 6,829,375 B1 * | 12/2004 | Higuchi | 348/294 |
| 7,139,414 B1 | 11/2006 | Suzuki et al. | 382/126 |

FOREIGN PATENT DOCUMENTS

| | | | |
|---|---|---|---|
| JP | 61-095680 | | 5/1986 |
| JP | 01-187858 | | 7/1989 |
| JP | 06-260630 | | 9/1994 |
| JP | 07-202141 | * | 8/1995 |
| JP | 07-245386 | | 9/1995 |

* cited by examiner

*Primary Examiner* — Nhan T Tran
(74) *Attorney, Agent, or Firm* — Hayes Soloway P.C.

(57) ABSTRACT

The solid state image pick-up device comprises a chip wherein an object to be photographed is put directly on the back surface of the chip, a light incident on the object enters the inner portion of the chip, signal electric charges generated in the inner portion of the chip by the light, the signal electric charges are collected in a photo detective region and the photo detective region has a barrier diffusion layer adjacent thereto so as to collect the signal electric charges effectively. The above-mentioned structure of the solid state image pick-up device can provide superior features that the chip of the solid state image pick-up device is protected from the deterioration of elements included in the chip and the destruction of the elements by Electro Static Discharge, resulting in the reliability improvement of the chip.

4 Claims, 4 Drawing Sheets

Fig.1 - PRIOR ART

Fig.3
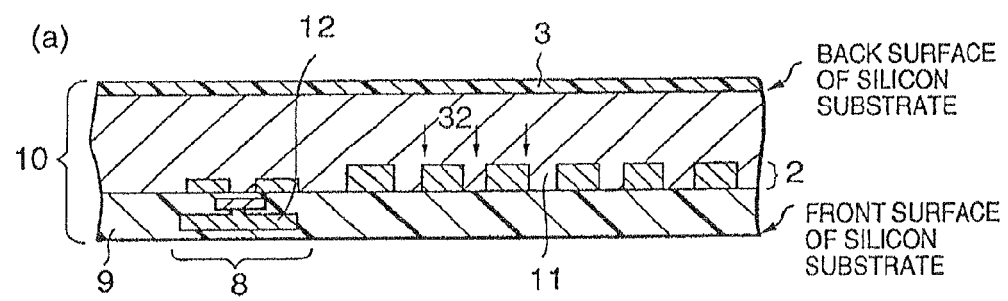
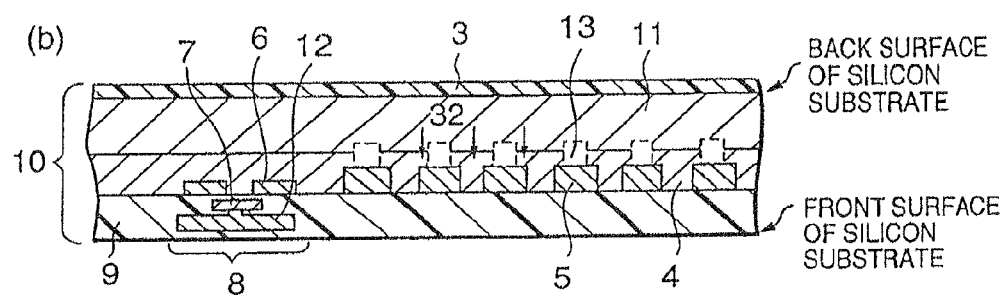
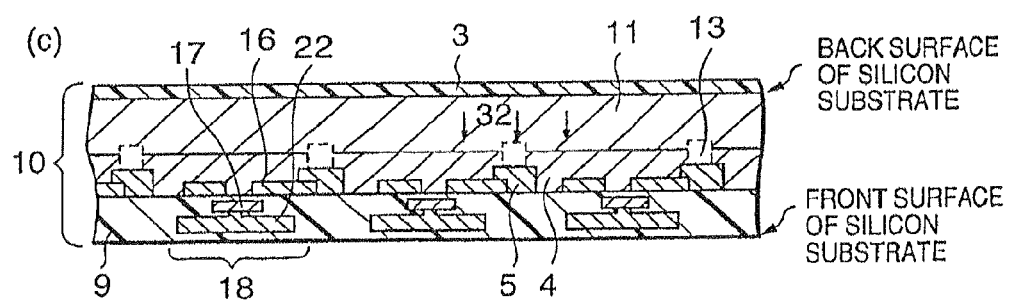

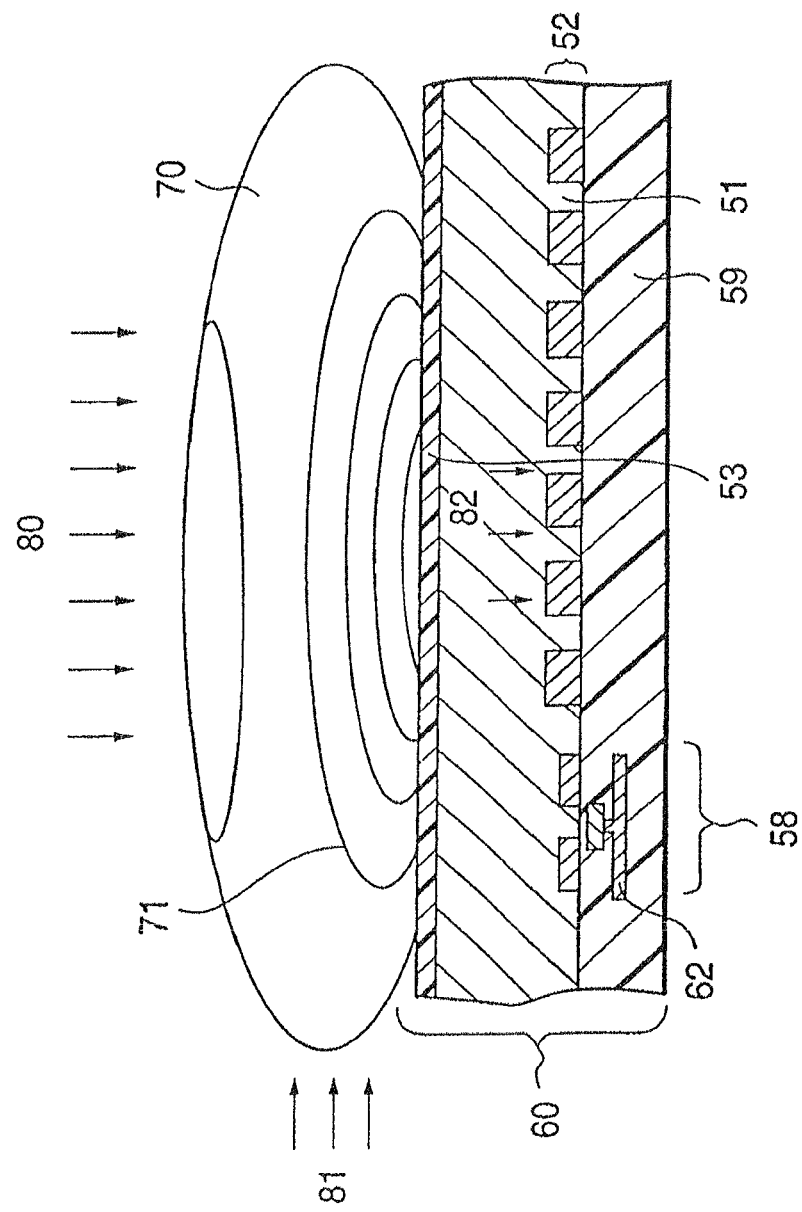

SOLID STATE IMAGING DEVICE FOR IMAGING AN OBJECT PLACED THEREON

This application is a divisional of application Ser. No. 11/268,812, filed Nov. 7, 2005, now U.S. Pat. No. 8,233,063, issued Jul. 31, 2012, which is in turn, a continuation of the application Ser. No. 08/907,036, filed Jul. 17, 2001, now U.S. Pat. No. 7,030,919, issued Apr. 18, 2006.

BACKGROUND OF THE INVENTION

1. Field of the Invention

The present invention relates to a solid state image pick-up device and, more particularly, it relates to the structure of a solid state image pick-up device picking up an image of an object that is directly put on the surface of the solid state image pick-up device.

2. Description of the Related Art

Conventionally, when an image of a fingerprint is outputted by a fingerprint image input system that uses solid state image pick-up devices such as a CCD image sensor or a CMOS image sensor, the system has been required to have optical parts such as a lens, a prism or a fiber in addition to the above solid state image pick-up device. For that reason, the system had to have substantial space to accommodate the rather expensive optical part, including its fixing position. Thus, the system has not been easily thinned, miniaturized or cost-reduced.

Furthermore, the image obtained through the optical part processing was apt to include image distortion.

To solve the above-stated problems, there is provided a conventional fingerprint image photographing method in U.S. patent application Ser. No. 09/494,506 that the finger (fingerprint) to be photographed is placed near or put directly on the surface of the solid state image pick-up device. This method need not, employ optical parts such as a lens or a prism and enables the fingerprint image input system to be thinned, miniaturized and cost-reduced. In addition, this method also eliminates a distortion caused by an optical processing.

On the other hand, a conventional method is known that uses an electrostatic capacitive sensor for performing an image input of a fingerprint. According to this method, a finger is directly put on the surface (upper surface) of a chip, on which a capacitor electrode is formed, to get the fingerprint image. The electrostatic capacitive sensor does not need to incorporate the above-mentioned optical parts but is fundamentally weak against the stress caused by electrostatic discharge. In addition, it does not show a good sensitivity in getting the fingerprint image since it is affected easily by the degree of finger dryness.

FIG. 1 shows an example in which a CMOS image sensor is used to photograph a fingerprint image by putting the finger directly on the surface (upper surface) of a chip 110. As shown in FIG. 1, a CMOS sensor is formed so as to include photo detective regions 102 arrayed in a matrix in a silicon substrate 101. In this structure, signal electric charges collected in the photo detective region 102 are transferred to a peripheral MOSFET 108 through a wiring 112. The surface of the silicon substrate 101 including the peripheral MOSFET 108 and the wiring 112 is covered by an interlayer insulating film 109 consisting of a silicon dioxide.

When a finger 120 is put directly on the surface of the interlayer insulating film 109 on the silicon substrate 101, lights 130 and 131 irradiated from a fluorescent lamp or an LED are incident on crista lines of a fingerprint 121 and reflected thereon so as to enter the inner portion of the silicon substrate 101. After that, the signal electric charges are generated in the inner portion of the silicon substrate 101 and collected by the photo detective region 102, and finally outputted as a fingerprint image.

However, the problem with this method is that the chip 110 is easily, physically broken. This problem occurs as follows: first, the finger 120 is put directly on the surface of the chip 110 (the problem becomes serious especially when the finger is put on the photo detective region 102), secondly the surface of the chip 110 is scrubbed or damaged by a finger nail, resulting in a chip surface scratch on the chip or at worst the breakage of the chip together with the elements included therein.

Furthermore, another problem is with this method is that the chip is apt to deteriorate its electric characteristics by the diffusion of contamination materials to the inner portion of the chip. This phenomenon is caused by the adherence of various contaminant materials to the revealed surface of the chip 110. Especially when sodium or the like adheres to the surface of the chip, it rapidly diffuses into the chip 110 and deteriorates the characteristics of the elements. Moreover, one more problem is seen with this method. When the finger 120 is put directly on the surface of the chip 110, it is located very near the wiring 112. The static electricity generated when the interlayer insulating film 109 is touched by the finger 120 discharges through the wiring 112 destroying the gate insulation film of the peripheral MOSFET 108 of FIG. 1. The destruction is caused as follows: first, as shown in FIG. 1, the finger 120 is put directly on the interlayer insulating film above the MOSFET 108 or the wiring 112; secondly, excess Electro Static Discharge (ESD) included in the finger 120 is applied to the surface of the chip 110; and finally, these elements, like MOSFET 108, are destroyed by ESD through the wiring 112 since the elements are usually not protected electrically by a protection circuit against ESD.

SUMMARY OF THE INVENTION

It is an object of the present invention to provide a solid state image pick-up device that is able to collect an incident light signal effectively therein under the condition that an object to be photographed is directly put on a surface of the solid state image pick-up device. As a result, the configuration constituted by the solid state image pick-up device can prevent a chip from the contamination by the contaminant materials or the destruction by Electro Static Discharge. More concretely, in the solid state image pick-up device according to the present invention, a photo detective region is included in the solid state image pick-up device that is formed in a semiconductor substrate and a necessary light information is transferred from a back surface of the semiconductor substrate to the photo detective region. In addition to it, the light information enters the inner portion of the semiconductor substrate by putting the object directly on the back surface of the semiconductor substrate in which the solid state image pick-up device is formed and irradiating a light on the object, thereby finally outputting the image of the object. In more detail, the solid state image pick-up device according to the present invention is described as follows:

The solid state image pick-up device as a principal configuration according to the present invention comprises a semiconductor substrate, a photo detective region formed in one surface region of the semiconductor substrate, wherein a light incident on an object enters the inner portion of the semiconductor substrate through another surface region of the semiconductor substrate, the light that entered the inner portion of the semiconductor substrate is converted to signal electric charges by photoelectric conversion, the signal electric charges are collected in the photo detective region to output the signal electric charges finally as an image of the object.

The solid state image pick-up device as a principal configuration has following application forms.

The solid state image pick-up device as a first application form having an insulation layer on the another surface of the semiconductor substrate, wherein the insulation layer consists of any one of a silicon dioxide film, a silicon nitride film and a silicon oxy nitride film or laminated films combined by selecting at least two films from a silicon dioxide film, a silicon nitride film and a silicon oxy nitride film, and the light incident on the object enters the inner portion of the semiconductor substrate through the insulation layer.

The solid state image pick-up device as a second application form is the solid state image pick-up device wherein the light enters the inner portion of the semiconductor substrate by photographing the object under the condition that the object is put on the another surface of the semiconductor substrate and then the subject is made to be still on the another surface of the semiconductor substrate, or then the subject is made to be moving on the another surface of the semiconductor substrate.

The solid state image pick-up device as a third application form is the solid state image pick-up device wherein the light consists of any one of a visible light, a near infrared light and an infrared light.

The solid state image pick-up device as a fourth application form is the solid state image pick-up device wherein the semiconductor substrate has one conduction type, the photo detective region is a photo detective diffusion layer having a conduction type opposite to that of the semiconductor substrate and the photo detective layer has impurity density of less than $1 \times 10^{17}/cm^3$.

The solid state image pick-up device as a fifth application form is the solid state image pick-up device wherein the semiconductor substrate has one conduction type, a plurality of photo detective regions having a conduction type opposite to that of the semiconductor substrate are formed, a barrier diffusion layer having a conduction type opposite to that of the semiconductor substrate is formed between the photo detective region and another photo detective region adjacent to the photo detective region, a bottom diffusion region having one conduction type and lower impurity density than that of the barrier diffusion layer comes in contact with the bottom of the photo detective region, the barrier diffusion layer is formed deeper than the photo detective region surrounding the photo detective region or coming at least in contact with a part of the photo detective region. In one preferable application form of the fifth application form of the solid state image pick-up device, the bottom diffusion region constitutes a part of the semiconductor substrate or is formed so as to diffuse one conduction type impurity into the semiconductor substrate having impurity density different from that of the semiconductor substrate. In another preferable application form of the fifth application form of the solid state image pick-up device, a top diffusion layer having another conduction type and higher impurity density than that of the photo detective region comes in contact with the photo detective region, and a part of the top diffusion layer is formed in the barrier diffusion layer constituting a source/drain region of a transistor.

Finally, the solid state image pick-up device as a sixth application form is the solid state image pick-up device wherein a CMOS image sensor or a CCD image sensor is formed in the semiconductor substrate.

BRIEF DESCRIPTION OF THE DRAWINGS

FIGS. 3(a) to 3(c) are cross-sectional views of the solid state image pick-up device for explaining a first and second embodiments of the present invention; and FIG. 4 is a schematic cross-sectional view of the solid state image pick-up device for explaining a third embodiment of the present invention.

DESCRIPTION OF THE PREFERRED EMBODIMENTS

Figure 1:
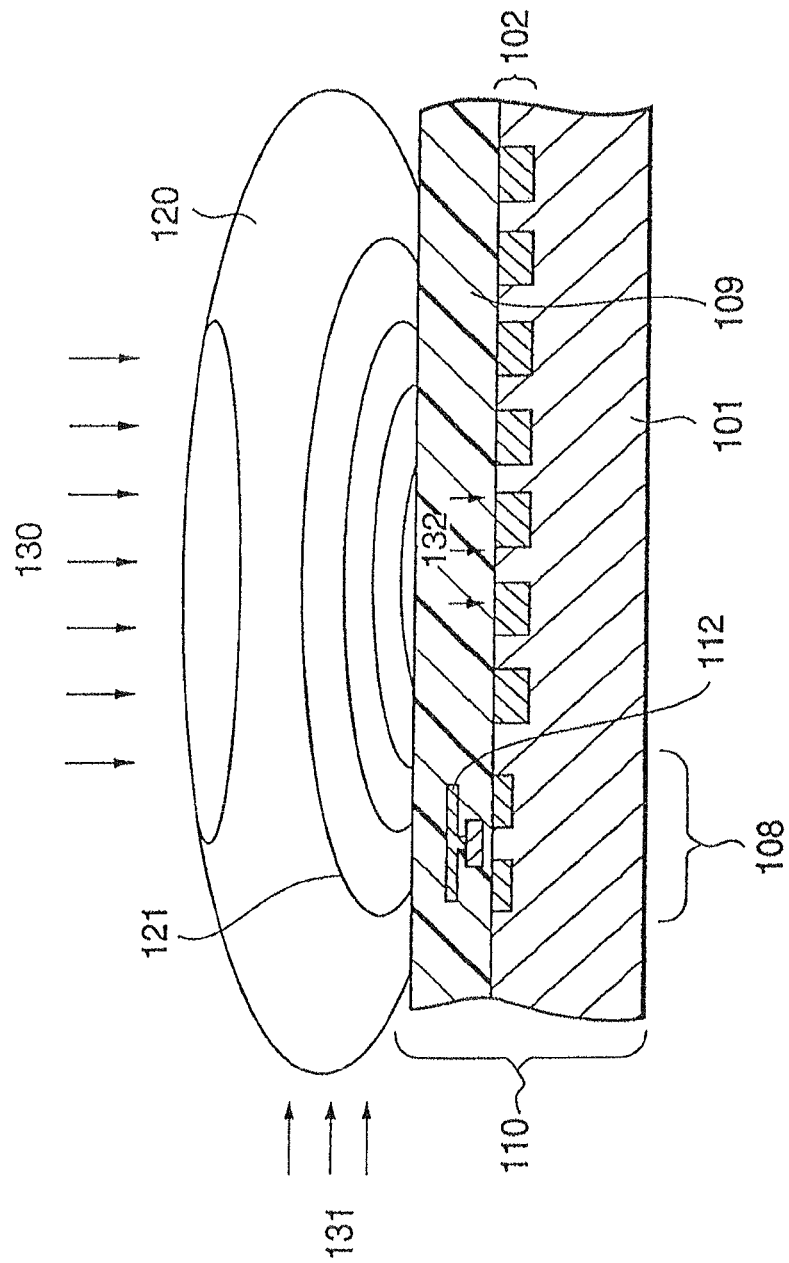
FIG. 1 is a schematic cross-sectional view of the solid state image pick-up device for explaining a conventional fingerprint image photographing method.
Figure 2:
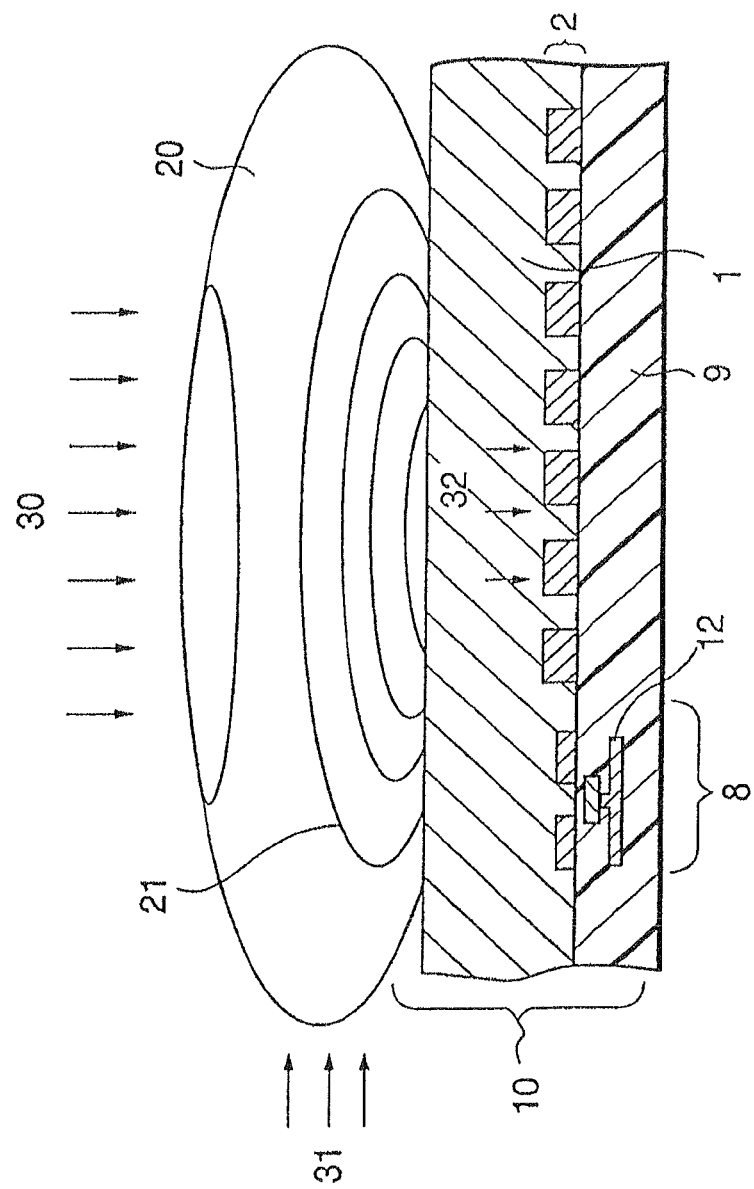
FIG. 2 is a schematic cross-sectional view of the solid state image pick-up device for explaining a first embodiment of the present invention.

A first embodiment of the present invention will be described with reference to a cross-sectional view of FIG. 2. FIG. 2 is a schematic cross-sectional view viewing from the location so as to be able to see a cross sectional area of a finger and a semiconductor substrate of a solid state image pick-up device, when an image of a fingerprint is photographed. In this embodiment, the image of the fingerprint is photographed by putting the finger directly on the back surface of the semiconductor chip of a CMOS image sensor.

The CMOS image sensor comprising a plurality of photo detective regions 2 arrayed in a matrix is formed in a silicon substrate whose impurity density is about $1 \times 10^{15}/cm^3$. A semiconductor chip 10 exposes its back surface to the external atmosphere and when a finger 20 is put directly on the back surface of the chip 10, an image of a fingerprint 21 is photographed by a light 30 incident on the fingerprint 20 penetrating the finger 20 into the photo detective regions 2 or a light 31 incident on the fingerprint 20 and reflected from the crista line of the fingerprint 21 to the photo detective regions 2, each light irradiated from a fluorescent lamp or an LED. In this operation, the light consists of any one of a visible light a near infrared light and an infrared light. When the near infrared light is irradiated, the light 32 from the back surface of the silicon substrate 1 reaches nearer the photo detective region 2, thus the photo detective regions 2 that are formed in the surface region of the silicon substrate 1 can easily collect signal electric charges generated in the silicon substrate 1. In this case, in order to secure a sufficient diffusion length of the signal electric charge, the impurity concentration of the silicon substrate 1 is preferably set at less than $1 \times 10^{17}/cm^3$.

Compared with the conventional fingerprint image photographing method, the above-mentioned configuration of the first embodiment has advantages that as the object to be photographed is put on the back surface of the semiconductor chip, the finger as an object is never put on the front surface of the chip in which image pick-up elements are formed, resulting in the prevention of the chip breakage, the deterioration and electrostatic breakdown of elements, and in the reliability improvement of the chip.

As for electrostatic breakdown, since a wiring 12 is not located on the side of the finger 20, excessive static electricity from the finger 20 is not applied to the elements. In addition, since the back surface region of the silicon substrate is normally fixed to ground potential showing a large input capacitive characteristic, the elements formed in the front surface region of the silicon substrate are not easily destroyed by electrostatic breakdown.

Furthermore, since the back surface in which the elements are not formed is revealed to the atmosphere instead of the front surface in which the elements are formed, various contaminant materials never adhere directly to the front surface of the chip, resulting in the element electrical characteristics rarely deteriorating.

A second embodiment of the present invention will be described with reference to a cross-sectional view of FIG. 3(a). As is the case with the first embodiment, in the later-described other embodiments, the object to be photographed is put directly on the back surface of the chip and is omitted from the figures to show only the chip for explanatory convenience. FIG. 3(a) is a cross sectional view of a CMOS image sensor in which the signal electric charges are effectively collected in the photo detective region when the object to be photographed is put directly on the back surface of the p type silicon substrate 11. In FIG. 3(a), the chip 10 is drawn in the same physical relationship as in FIG. 2 showing the back surface of the p type substrate 11 at the lower side of the figure.

When comparing the second embodiment with the first embodiment, in the second embodiment the back surface of the chip 10 is covered by an insulation layer 3, but in the first embodiment it is not covered. For the insulation layer, a silicon dioxide film, a silicon nitride film or a silicon oxy nitride film is available.

In this embodiment, different from the case of the first embodiment, the contamination through the back surface of the chip occurred by such contaminant source as sodium is prevented. Furthermore, when the silicon nitride is formed on the back surface of the chip as shown in this embodiment, as the silicon nitride has a feature of effectively preventing the contaminant such as sodium from entering inside the chip, it is easily applied to protect the chip. Contrary to the above-stated condition in the second embodiment, if the silicon nitride film is formed on the front surface of the chip as described in the conventional fingerprint image photographing method, it gives large stress on the elements especially when it is formed thick in film thickness, and thus has an adverse effect on the reliability of the elements. That is, the chip of the second embodiment is rarely affected by the stress that is generated by the silicon nitride film. The diffusion layers configuration in the chip shown in the first and second embodiments will be described with reference to the cross sectional views of FIG. 3(b) and FIG. 3(c). These embodiments both show the case in which an insulation layer is formed on the back surface of a chip, but may include the case as another application of the embodiments that an insulation layer is not formed on the back surface of a chip. FIG. 3(b) describes the array of the photo detective regions and peripheral MOSFETs formed in the peripheral area of the array of the photo detective regions. FIG. 3(c) describes the array of the photo detective regions and charge dumping MOSFETs to dump the signal electric charges accumulated in the photo detective regions.

First, as shown in FIG. 3(b), a P type well layer 4 and an N type photo detective diffusion layer 5 as a photo detective region are formed in the front surface region of a P type silicon substrate 11. The impurity density of the P type well 4 is set higher than that of the P type silicon substrate 11. A pn-junction between the N type photo detective diffusion layer 5 and the P type silicon substrate 11 can be formed by the N type photo detective diffusion layer 5 and the P type silicon substrate 11, or as shown in FIG. 3(b), may be formed by the N type photo detective diffusion layer 5 and a P type region 13 (the region surrounded by a broken line as indicated in the same figure) that has lower impurity density than the P type well layer 4. An N type source/drain diffusion layer 6 is formed in the P type well layer 4 constituting a peripheral MOSFET 8 together with a gate electrode 7.

As shown in FIG. 3(c), a charge dumping MOSFET 18 formed near around the N type photo detective diffusion layer 5 for dumping the accumulated signal electric charges is formed in the same structure as the peripheral MOSFET 8. An N type source/drain diffusion layer 16 of the charge dumping MOSFET 18 is made contact with the N type photo detective region in a manner that the two N type diffusion layers combine together. Moreover, a wiring 22 is formed to connect those diffusion layers to other elements and finally an interlayer insulating film 9 is formed to cover the whole surface of the silicon substrate 11. Various applications are available for the present invention as the changed forms of these embodiments as follows:

First, in these embodiments, although the charge dumping MOSFET 18 and the peripheral MOSFET 8 are formed in the same manufacturing process, needless to say, the two MOSFETs may be formed in different manufacturing process.

Secondly, in these embodiments, although the P type well layer 4 and the N type photo detective diffusion layer 5 are formed in contact with each other all over the side surface of the N type photo detective diffusion layer 5 or at least a part of the side surface of the N type photo detective diffusion layer 5, the two diffusion layers may be formed separating from each other. Thirdly, the P type well layer 4 is not necessarily formed so as to surround all over the N type photo detective diffusion layer 5, and it may be formed so as to surround at least a part of the N type photo detective diffusion layer 5, which is allowed within the condition that the N type photo detective diffusion layer 5 can collect the signal electric charges generated by incident light effectively.

Fourth, in these embodiments, the N type photo detective diffusion layer 5 is formed deeper than the N type source/drain diffusion layer 16 of the charge dumping MOSFET 18 and is formed in lower impurity density than the N type source/drain diffusion layer 16.

Fifth, although the N type source/drain diffusion layer 16 is formed partly overlapping the N type photo detective diffusion layer 5 as shown in FIG. 3(c), it may be formed overlapping in the whole surface of the N type photo detective diffusion layer 5.

Referring to the diffusion layer structures described in FIGS. 3(b) and 3(c), as the PN junction formed by the N type photo detective diffusion layer 5 locates at deep portion of the P type silicon substrate 11 in the vertical direction, the N type photo detective diffusion layer 5 easily extends its depletion region to deeper portion of the P type silicon substrate 11 when the PN junction is back biased, resulting in the effective collection of the signal electric charges generated near the back surface of the P type silicon substrate 11 by the N type photo detective diffusion layer 5. In addition to it, as the P type well layer 4 is formed between the N type photo detective diffusion layers 5, it can prevent the signal electric charges accumulated in the N type photo detective diffusion layer 5 from jumping into the another N type photo detective diffusion layers 5 adjacent thereto.

A third embodiment of the present invention will be described with reference to a cross-sectional view of FIG. 4. In FIG. 4, a finger is put directly on the back surface of a CCD image sensor chip 60 and the image of a fingerprint is photographed.

Referring to the CCD image sensor chip 60 shown in FIG. 4, a plurality of photo detective regions 52 arrayed in a matrix, an output MOSFET 58 for outputting the signal electric charges accumulated in the photo detective region 52, a wiring 62 for connecting the elements formed in a silicon substrate 51, and an interlayer insulating film 59 covering the whole surface of the silicon substrate 51 are formed in the silicon substrate 51. An insulation layer 53 consisting of a silicon dioxide film, a silicon nitride film or a silicon oxy nitride film is formed on the back surface of the silicon substrate 51 as is the case with the first embodiment.

The COD image sensor chip 60 exposes its back surface to the external atmosphere and when a finger 70 is put directly on the back surface of the chip 60, an image of a fingerprint 71 is photographed by a light 80 incident on the fingerprint 70 penetrating the finger 70 into the photo detective regions 52 or a light 81 incident on the fingerprint 70 and reflected from the crista line of the fingerprint 71 to the photo detective regions 52, each light irradiated from a fluorescent lamp or an LED. As a solid state image pick-up device, when a CCD image sensor is used to obtain the image of a fingerprint, the CCD image sensor shows the same effect as is shown in the case of the CMOS image sensor and can improve the reliability of the chip. Although the above-mentioned embodiments are the cases that the object to be photographed is fingerprint, the object is not limited to the fingerprint, but the other objects may be photographed. Furthermore, the above-mentioned embodiments are not limited to the case that the object to be photographed is a finger and the finger is set to be still on the back surface of a semiconductor substrate during being photographed. That is, the embodiments may include the case that after the object is put on the back surface of the semiconductor substrate, the object may move on the back surface of the semiconductor substrate during being photographed.

As mentioned above, the solid state image pick-up device according to the present invention has features as follows: the chip of the solid state image pick-up device is used for photographing the image of an object that is put directly on the surface of an insulation layer, which covers the back surface of the chip; and a light incident on the object enters the inner portion of chip; and signal electric charges are generated by the light that enters the inner portion of the chip; and the signal electric charges are collected in a photo detective region; and the photo detective region has a barrier diffusion layer adjacent thereto so as to collect the signal electric charges effectively. The above-mentioned structure of the solid state image pick-up device can provide superior features that the chip of the solid state image pick-up device is protected from the deterioration of elements included in the chip and the destruction of the elements by Electro Static Discharge, resulting in the reliability improvement of the chip.

What is claimed is:

1. A solid state image pick-up device comprising:
   a semiconductor substrate having a front surface and a rear surface;
   a MOSFET formed over said semiconductor substrate at a side of the front surface; and
   a photo detective layer formed in said semiconductor substrate at a side of the front surface and detecting a near infrared light entering through the rear surface, wherein said photo detective layer comprises:
   a first region having a first conductive type;
   a plurality of second regions having a second conductive type opposite to the first conductive type, each of said second regions constituting a photo diode and being separated from each other by said first region;
   said plurality of second regions having a top surface that is positioned at a side of said front surface and a bottom surface that is positioned at a side of the rear surface; and
   a third region contacting the bottom surface of one of said second regions and having the first conductive type, said third region being lower in impurity density than said first region, and
   wherein an impurity concentration of the semiconductor substrate is less than $1 \times 10^{17}/cm^3$.

2. The solid state image pick-up device according to claim 1, wherein said first region is deeper than said second regions.

3. The solid state image pick-up device according to claim 1, wherein said MOSFET has source and drain regions of said second conductive type, one of said source and drain regions contacting with one of said second regions.

4. The solid state image pick-up device according to claim 1, wherein said semiconductor substrate comprises a silicon substrate.

* * * * *

UNITED STATES PATENT AND TRADEMARK OFFICE
CERTIFICATE OF CORRECTION

PATENT NO. : 8,416,330 B2  
APPLICATION NO. : 13/550256  
DATED : April 9, 2013  
INVENTOR(S) : Ohkubo et al.

Page 1 of 1

It is certified that error appears in the above-identified patent and that said Letters Patent is hereby corrected as shown below:

On the Title Page

Item (60) "continuation of application No. 08/907,036, filed on" should be --continuation of application No. 09/907,036, filed on--

Signed and Sealed this  
Sixth Day of August, 2013

Teresa Stanek Rea  
*Acting Director of the United States Patent and Trademark Office*